United States Patent
Shedlock et al.

(10) Patent No.: US 10,459,091 B2
(45) Date of Patent: Oct. 29, 2019

(54) RADIATION DETECTOR AND SCANNER

(71) Applicant: Varex Imaging Corporation, Salt Lake City, UT (US)

(72) Inventors: Daniel Shedlock, Knoxville, TN (US); David T Nisius, Des Plaines, IL (US); Josh M Star-Lack, Palo Alto, CA (US); Samuel Donnald, Maryville, TN (US); Gary F Virshup, Cupertino, CA (US); James E Clayton, Saratoga, CA (US)

(73) Assignee: Varex Imaging Corporation, Salt Lake City, UT (US)

( * ) Notice: Subject to any disclaimer, the term of this patent is extended or adjusted under 35 U.S.C. 154(b) by 93 days.

(21) Appl. No.: 15/283,082

(22) Filed: Sep. 30, 2016

(65) Prior Publication Data

US 2018/0095188 A1    Apr. 5, 2018

(51) Int. Cl.
*G01T 1/00* (2006.01)
*G01T 1/20* (2006.01)

(52) U.S. Cl.
CPC ................... *G01T 1/2018* (2013.01)

(58) Field of Classification Search
CPC .................................................. G01T 1/2018
See application file for complete search history.

(56) References Cited

U.S. PATENT DOCUMENTS

| | | | |
|---|---|---|---|
| 2009/0146070 A1* | 6/2009 | Vieira Da Rocha | G01T 1/2018 250/370.09 |
| 2009/0314947 A1* | 12/2009 | Goushcha | G01T 1/2018 250/363.01 |

* cited by examiner

*Primary Examiner* — Dani Fox
(74) *Attorney, Agent, or Firm* — Laurence & Phillips IP Law

(57) ABSTRACT

A system operable for detecting radiation to scan an object includes scintillators that have respective lengths that are greater than their respective widths and an imager that has a planar array of pixels. The scintillators are coupled to the imager with their respective longitudinal axes parallel to each other. An incoming radiation beam that has passed through the object enters the scintillators through respective surfaces of the scintillators that are transverse to the longitudinal axes, and is converted by the scintillators into light that is received by respective subsets of the planar array of pixels.

20 Claims, 8 Drawing Sheets

RADIATION DETECTOR AND SCANNER

BACKGROUND

Radiation detectors can be used in a variety of different ways. For example, a truck's cargo can be inspected accurately and non-invasively by situating the truck's trailer between a radiation source and a radiation detector. In this manner, an inspection of the trailer's contents can be performed relatively quickly and conveniently because it is not necessary to unload the cargo in order to perform the inspection. Nevertheless, inspection speeds are still somewhat limited by the capabilities of contemporary radiation detectors. In other words, there is a continuing need to improve the efficiency at which accurate inspections can be conducted, so that those inspections can be performed quickly without affecting accuracy.

SUMMARY

A system operable for detecting radiation to scan an object includes scintillators that have respective lengths that are greater than their respective widths and an imager that has a planar array of pixels. The scintillators are coupled to the imager with their respective longitudinal axes parallel to each other. An incoming radiation beam that has passed through the object enters the scintillators through respective surfaces of the scintillators that are transverse to the longitudinal axes, and is converted by the scintillators into light that is received by respective subsets of the planar array of pixels.

The pixels that receive light from the scintillators generate signals in response to the light. The system can also include circuitry coupled to the imager that converts the signals generated by the pixels into electrical signals, that can be processed to produce information about (e.g., an image of) the object.

In an embodiment, the scintillators are coupled to the imager such that the longitudinal axes are parallel to the planar array of pixels. In another embodiment, the imager also includes reflective material that separates the array of pixels into a first planar array of pixels and a second planar array of pixels, in which case the scintillators traverse the first planar array, the light-reflective material, and the second planar array, so that light generated in the scintillators downstream of the first planar array is reflected by the light-reflective material to the second planar array.

In an embodiment, the scintillators are coupled to the imager such that the longitudinal axes are perpendicular to the first planar array of pixels.

In an embodiment, light-reflective material covers (coats) each of the surfaces of each of the scintillators except the surfaces that face the incident radiation beam and except the surfaces that are facing the imager. In another embodiment, light-reflective material covers (coats) each of the surfaces of each of the scintillators, including the surfaces of the scintillators facing the imager except for respective openings in those surfaces, and except the surfaces that face the radiation beam; thus, the scintillators function like a light pipe.

In an embodiment, in a mode referred to as a zoom mode, only a subset of the signals from less than all of the pixels that receive light from the scintillators is sampled per sample interval.

As a result of the detecting and scanning features summarized above, embodiments according to the invention improve the efficiency at which accurate inspections can be conducted, so that those inspections can be performed quicker without affecting accuracy.

These and other objects and advantages of the various embodiments of the invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. Unless noted otherwise, the drawings are not to scale.

DETAILED DESCRIPTION

Figure 1A:
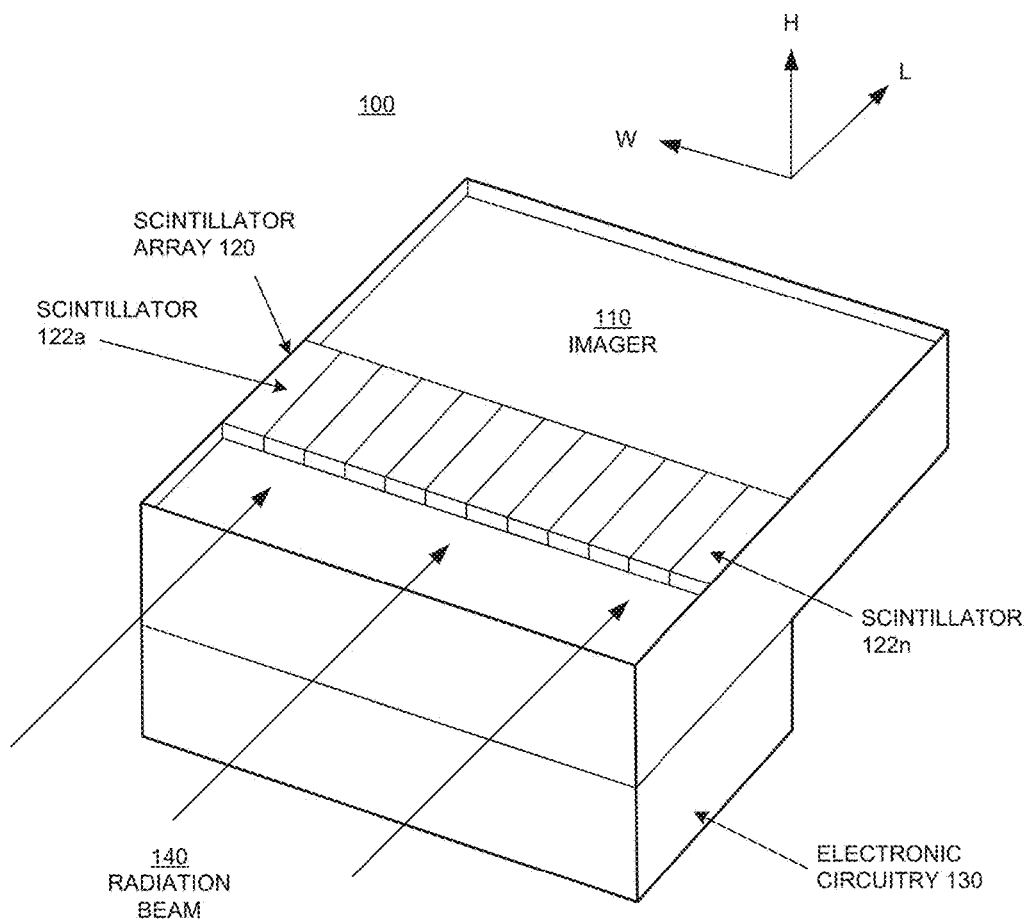
FIG. 1A illustrates a system (a radiation detector and scanner) that can be used to detect radiation and/or scan an object in an embodiment according to the invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sampling," "generating," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., a solid state drive [SSD] or non-volatile memory device [NVMD]) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1A illustrates an apparatus or system 100 (a radiation detector and scanner) that can be used to detect radiation and/or scan an object in an embodiment according to the invention. In the FIG. 1A embodiment, the system 100 includes an imager 110, a scintillation array 120, and associated electronics or electronic circuitry 130.

Figure 1B:
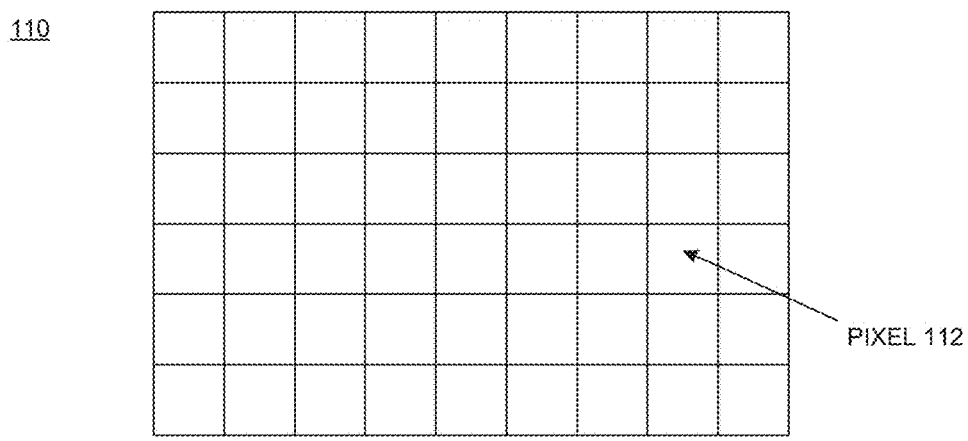
FIG. 1B illustrates an array of pixels in a system that can be used to detect radiation and/or scan an object in an embodiment according to the invention.

In general, the imager 110 (which may also be referred to as a sensor, a sensor array, or a sensor panel) and the scintillation array 120 are closely coupled so that the imager can receive the light photons (or simply "light") emitted by the scintillation array and can convert the light into electrical signals. In an embodiment, the imager 110 is an amorphous silicon (a-Si) photodiode, thin-film-transistor (TFT) array. In such an embodiment, the a-Si substrate is pixilated—that is, the substrate is divided into a number of separate pixel elements 112 (or simply "pixels") as shown in FIG. 1B. The surface of the imager 110 is planar (e.g., flat) and the pixels are arrayed on the surface. The invention is not limited to an a-Si TFT imager; in general, any type of element that can convert light into electrical signals can be used, including but not limited to crystalline photodiodes, complementary metal-oxide silicon (CMOS) devices, and charge-coupled devices (CCDs).

In general, the scintillation array 120 of FIG. 1A includes a number of scintillators 122a-122n (collectively referred to herein as the scintillators 122). Each of the scintillators 122 includes scintillator material that can emit light photons in response to absorption of the radiation beam in the scintillation array 120. The imager 110 receives the light that is thusly generated by and emitted from the scintillation array 120. A photodiode associated with each pixel of the imager 110 accumulates the charges generated from the light. The pixels (e.g., the TFTs) in the imager 110 are energized (switched on or closed) to permit the accumulated charges to flow as electrical signals to the electronic circuitry 130. Thus, the light photons are converted into electrical signals. The electronic circuitry 130 (FIG. 1A) can include circuitry that selectively energizes the pixels (e.g., the TFTs) in the imager 110 in order to sample the pixels.

Figure 9A:
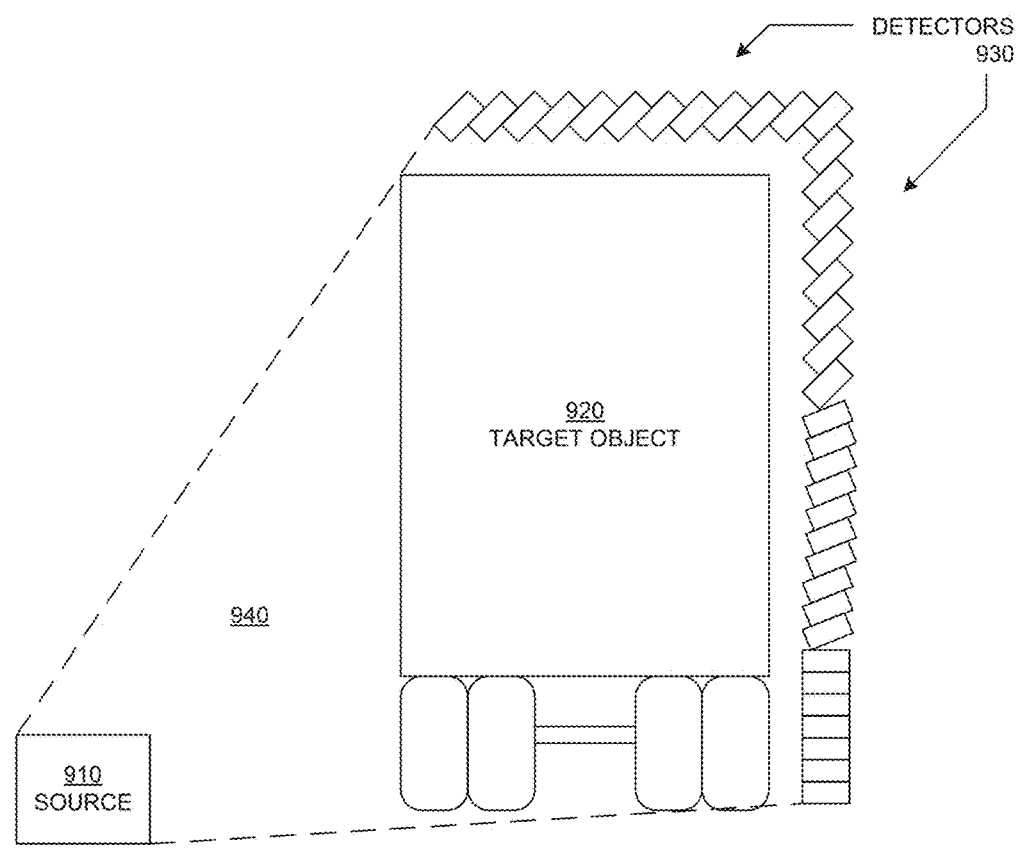
FIGS. 9A and 9B illustrate the use of system for scanning an object in an embodiment according to the invention.

In operation, a radiation source (e.g., a linear accelerator) generates and sends a radiation beam (e.g., an x-ray beam) through a target object, such as a cargo container or a truck trailer (see FIG. 9A). The portion of the radiation beam 140 not absorbed by the object strikes the scintillator array 120, which converts the radiation beam into light photons that strike the photodiodes in the imager 110 to generate electrical signals as just described. The electronic circuitry 130 can read out the electrical signals and convert them into digital data by means of an analog-to-digital converter, for example. The digital data, in turn, can be processed by a computer system or similar type of device to produce a high-quality image of the target object.

The system 100 of FIG. 1A can be used in different data collection modes. For example, the system 100 can be used in an integrating mode or in a counting mode. In the integrating mode, the energy absorbed by each pixel in the imager 110 as a function of time can be determined—each pixel measurement is the result of the sum of many radiation events within an object voxel over an interval of time (a voxel is a volumetric pixel, a three-dimensional element such as a cube, that represents a portion of a three-dimensional environment, as opposed to a pixel, which is a two-dimensional element such as a square, that represents a portion of a two-dimensional environment like an image on a display screen). In the counting mode, the number of photons detected by each pixel in the imager 110 as a function of time can be counted—each pixel measurement represents a count of each single interaction between the radiation beam and an object voxel over an interval of time. The length of each interval of time corresponds to the frame rate of the imager 110.

In an embodiment, only a subset of the pixels in the imager 110 is sampled at the same time. For example, less than all of the rows of pixels are sampled at a time. This type of operation may be referred to herein as "zoom mode." In zoom mode, data can be acquired quickly—frame rates of 400 Hz can be achieved by reducing the number of pixels that are sampled.

In an embodiment, the radiation beam includes x-rays as mentioned above. However, the radiation beam may instead include particulate radiation, such as electrons, protons, and heavy charged particles, or uncharged radiation, such as photons and neutrons.

In an embodiment, the scintillator material is cesium-iodide (CsI). In another embodiment, the scintillator material is cadmium tungstate ($CdWO_4$). Other light-emitting scintillator materials (e.g., bismuth germinate (BGO), lutetium yttrium orthosilicate (LYSO), and phosphor-based scintillators (e.g., $Gd_2O_2S$) may be used. Direct conversion materials or photoconductors (e.g., mercuric iodide, selenium, and lead iodide) can also be used.

The scintillators 122 have respective lengths that are greater than their respective widths and greater than their respective heights (where length L, width W, and height H are defined as shown in FIG. 1A). As such, the scintillators 122 can be described as being cuboids or rectangular cuboids (each of the faces is a rectangle) or as being square cuboids (at least two faces are squares).

In general, the ratio of length to width is not limited except for practical considerations. In various embodiments, the pixel pitch (the distance between adjacent pixels) can be in the range of tens of microns to centimeters. For example, the pixel pitch can be 100 microns, in which case the scintillator would have a minimum width of 100 microns. The length of the scintillator can be, for example, four centimeters. In an embodiment, the length is up to 400 times the width; however, the invention is not so limited.

Figure 3:
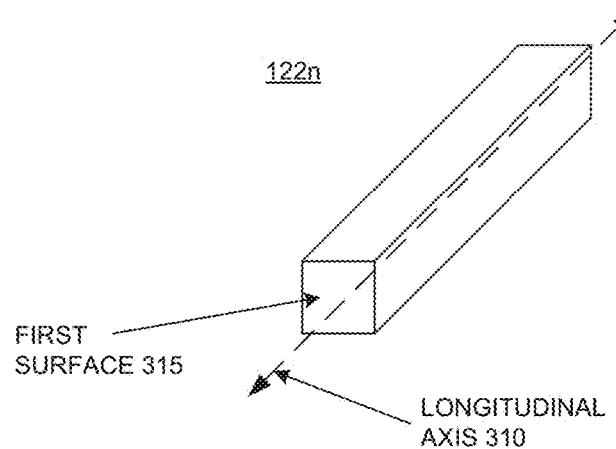
FIG. 3 illustrates a scintillator in a system that can be used to detect radiation and/or scan an object in another embodiment according to the invention.

With reference to FIG. 3, the scintillators 122 in the scintillation array 120 (e.g., the scintillator 122n) have respective longitudinal axes 310, where the term "longitudinal axis" has its common meaning. That is, the longitudinal axis 310 is an imaginary straight line that extends through and along the entire length of each of the scintillators 122. The scintillators 122 are arrayed in the scintillation array 120 such that their respective longitudinal axes 310 are parallel to each other.

Continuing with reference to FIGS. 1A and 3, an incoming (incident) radiation beam 140 (e.g., an x-ray beam) enters the scintillators 122 in the scintillation array 120 through respective surfaces 315 (also referred to herein as "first surfaces") of the scintillators. The surfaces 315 through which the radiation beam 140 enters the scintillators 122 are transverse to (they extend across) the respective longitudinal axis 310 of the scintillators. The radiation beam 140 enters the system 100 above the electronic circuitry 130. Only a part of the system 100 (e.g., the scintillator array 120 and the system's housing) is exposed to the direct beam. The exposed components can be radiation hard. As used herein, "radiation hard" means that the components can be exposed to an integral dose of at least one megarad (MRad) and still function as originally designed.

Figure 2:
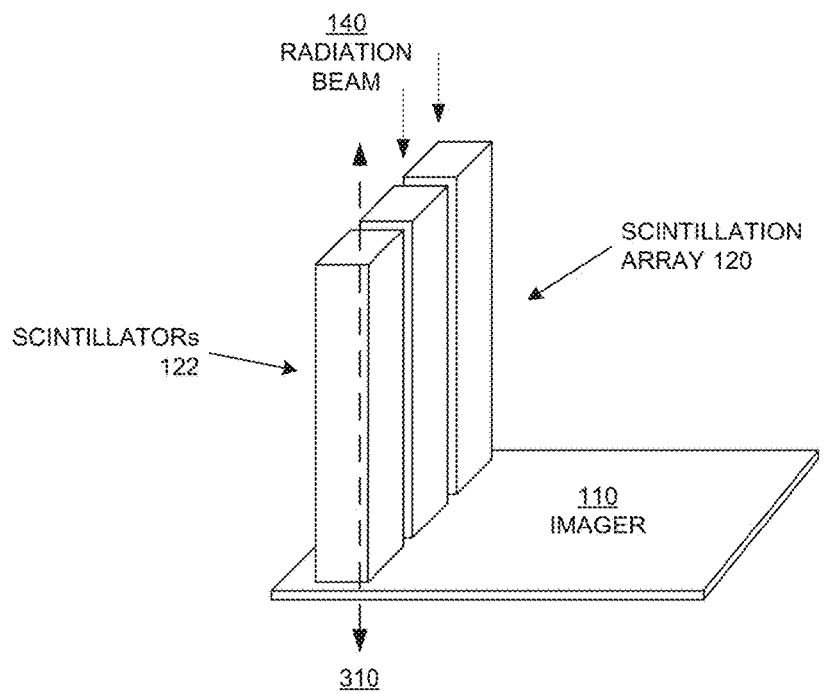
FIG. 2 illustrates a system that can be used to detect radiation and/or scan an object in another embodiment according to the invention.

In the FIG. 1A embodiment, the scintillation array 120 is side-coupled to the imager 110. That is, in an embodiment, the scintillators 122 are coupled to the imager 110 such that their longitudinal axes 310 are parallel to the planar surface of the imager. In another embodiment, the scintillators 122 are coupled to the imager 110 such that their longitudinal axes 310 are perpendicular to the planar surface of the imager as shown in FIG. 2. In FIG. 2, only a single row is illustrated; however, there can be many such rows, arranged to form any number of columns.

Figure 4:
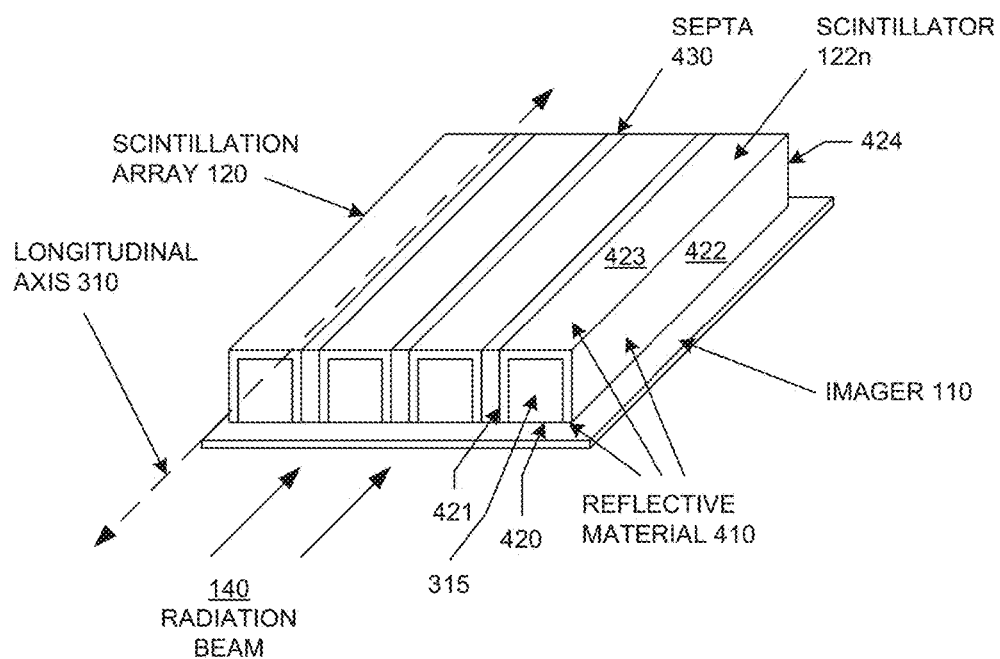
FIG. 4 illustrates a scintillation array and an imager in a system that can be used to detect radiation and/or scan an object in an embodiment according to the invention.

FIG. 4 illustrates the scintillation array 120 and the imager 110 in an embodiment according to the invention. In the example of FIG. 4, the scintillators 122 in the scintillation array 120 are side-coupled to the imager 110 along their lengths as in FIG. 1A. That is, the longitudinal axes 310 of the scintillators 122 are parallel to the planar surface of the imager 110. In another embodiment, the scintillators 122 are coupled to the imager 110 such that their longitudinal axes 310 are perpendicular to the planar surface of the imager as in FIG. 2.

In an embodiment, the scintillators 122 are separated from each other by a septa material 430 (which may be lead or tungsten, for example). The septa material 430 is for optical isolation of the pixels and controls how light is transported out of each pixel. The septa material can be, for example, specular (mirror-like) or diffuse (Lambertian/white).

In an embodiment, each of the surfaces of each of the scintillators 122 is covered (coated) with light-reflective material 410 (e.g., aluminized Mylar™) except for the surfaces 315 (the first surfaces) through which the incident radiation beam 140 enters the scintillators, and except for the respective surfaces 420 (also referred to herein as "second surfaces") that interface with (are facing) the imager 110. For example, the surface 421 running the length of one side of the scintillator 122n, the surface 422 running the length of the side opposite the surface 421, the surface 423 running the length of the side of the scintillator opposite the surface 420, and the surface 424 at the opposite end of the scintillator from the surface 315 are covered with the light-reflective material 410. In this embodiment, light generated by the scintillators 122 can be emitted along the entire lengths of the scintillators and collected and shared over many of the the pixels 112 of FIG. 1B (e.g., the a-Si photodiodes). The configuration illustrated in FIG. 4 is very good for high dose applications.

Figure 5:
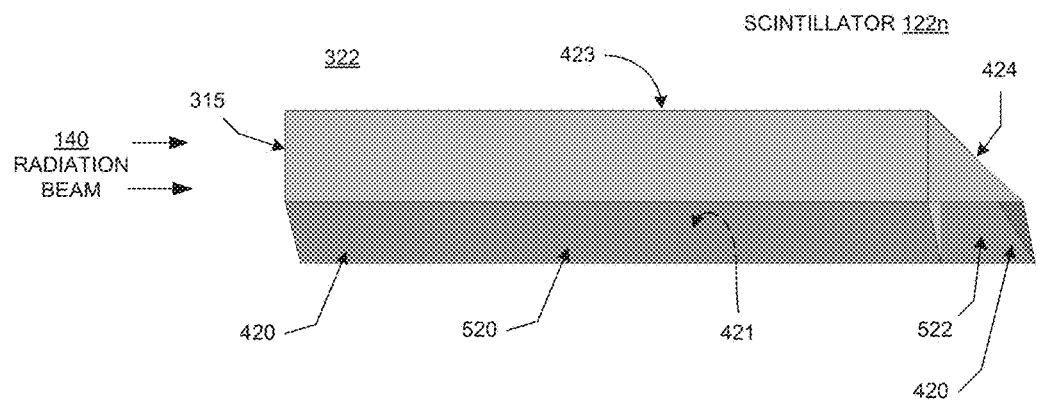
FIG. 5 illustrates a scintillator in another embodiment according to the invention.

FIG. 5 illustrates a scintillator (e.g., the scintillator 122n) in another embodiment according to the invention. The scintillator 122n in the embodiment of FIG. 5 would be side-coupled to the imager 110 with other scintillators along their lengths as in FIG. 4. Like the FIG. 4 embodiment, the surface 422 running the length of one side of the scintillator 122n (and the surface 421, not shown in FIG. 4, that runs the length of the side of the scintillator opposite the surface 422), the surface 423 running the length of the side of the scintillator opposite the surface 420, and the surface 424 at the opposite end of the scintillator from the surface 315 are covered (coated) with light-reflective material (e.g., aluminized Mylar™). However, in contrast to the FIG. 4 embodiment, in the FIG. 5 embodiment, only a portion 520 of the surface 420 that interfaces with the imager 110 (the imager is not shown in FIG. 5) is covered (coated) with light-reflective material, and a portion 522 of the surface 420 that interfaces with the imager is not covered with light-reflective material. In other words, there is an opening in the light reflective material on the surface 420 facing the imager 110.

The light generated by the scintillator 122n is reflected within the scintillator down the length of the scintillator to the opening in the reflective material at portion 522 and into the imager 110. In an embodiment, the surface 424 is at an angle (e.g., an acute angle) relative to the plane of the surface 315 as shown in FIG. 5, and the angled surface 424 reflects light through the opening.

Thus, in the FIG. 5 embodiment, the scintillators 122 function as light concentrators in the form of light pipes. The configuration illustrated in FIG. 5 concentrates the light from the scintillators 122 to produce signals that are high enough for the imager 110 to convert into electrical signals, and therefore is very good for low dose applications. Another advantage of this configuration is that only the signals from the subset of pixels in the imager 110 that interface with the opening in the reflective material need to be sampled.

In general, in the FIG. 4 embodiment, the scintillators 122 include light-reflective material on each of their respective surfaces except on their respective first surfaces 315 and except on their respective second surfaces 420, while in the FIG. 5 embodiment, the scintillators 122 include light-reflective material on each of their respective surfaces except on their respective first surfaces 315 but include light-reflective material on portions 520 of, although not all of (not in portion 522), their respective second surfaces 420.

Figure 6:
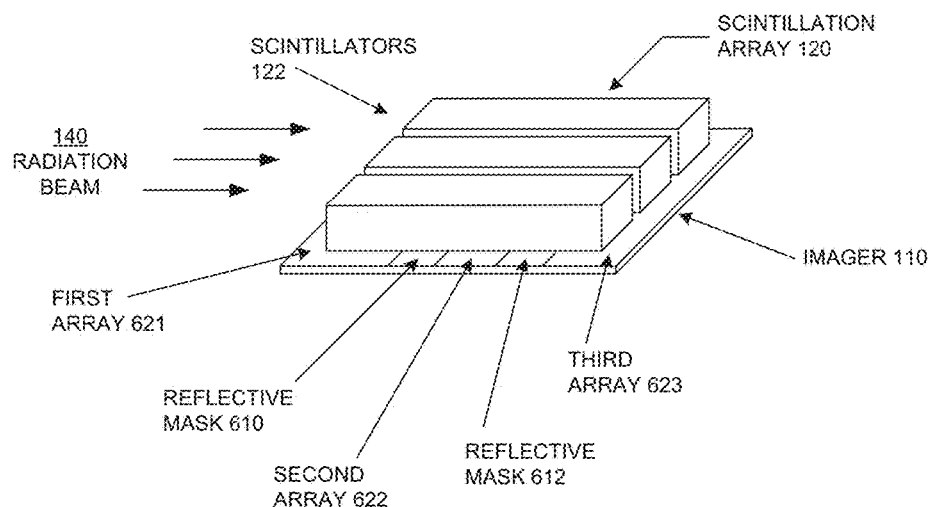
FIG. 6 illustrates a scintillation array and an imager in another embodiment according to the invention.

FIG. 6 illustrates the scintillation array 120 and the imager 110 in another embodiment according to the invention. In the example of FIG. 6, like the example of FIG. 4, the scintillators 122 in the scintillation array are side-coupled to the imager 110 along their lengths, and coated with light-reflective material and separated from each other by a septa material (the light-reflective and septa materials are not shown in FIG. 6). In the FIG. 6 embodiment, light-reflective material (a reflective mask 610, e.g., aluminized Mylar™) covers a portion of the pixels in the imager 110. Thus, the rows and columns of pixels in the imager 110 include, in essence, a first array 621 of rows and columns of pixels and a second array 622 of rows and columns of pixels that are separated by light-reflective material (the reflective mask 610). The scintillators 122 traverse the first array 621, the light-reflective mask 610, and the second array 622. Light generated in the scintillators 122 downstream of the first array 621 is reflected by the light-reflective mask 610 to the second array 622.

The first array 621 and the second array 622 can be implemented by masking a portion of the full array of pixels as described above, or they can be implemented as two individual arrays (on the same surface) that are separated by the light-reflective material. In either implementation, the first array 621 and the second array 622 can be coupled to the same electronic circuitry 130 (FIG. 1A).

In an embodiment, there are multiple reflective masks. In the example of FIG. 6, a second reflective mask 612 covers another portion of the pixels in the imager 110. Thus, the imager 110 includes a third array 623 of rows and columns of pixels that is separated from the second array 622 by light-reflective material (the reflective mask 612). The first array 621, the second array 622, and the third array 623 can be coupled to the same electronic circuitry 130 (FIG. 1A). The scintillators 122 traverse the first array 621, the light-reflective mask 610, the second array 622, the light-reflective mask 612, and the third array 623. Light generated in the scintillators 122 downstream of the first array 621 is reflected by the light-reflective mask 610 to the second array 622, and light generated in the scintillators 122 downstream of the second array 622 is reflected by the light-reflective mask 613 to the third array 623. Additional masks can be used to form additional arrays of pixels in the manner just described.

The configuration illustrated in FIG. 6 is very good for low dose applications. Another advantage of this configuration is that it is possible to measure the energy spectrum of the radiation beam 140. In essence, there are multiple points (the different arrays 621 and 622, and optionally the array 623, and so on) for collecting light photons. A higher-energy beam, for example, will generate more light photons at the furthest collection point (e.g., the third array 623) than a lower-energy beam. By evaluating the number of counts associated with each of the arrays 621, 622, etc., the energy distribution of the radiation beam 140 can be estimated. This in turn makes it possible to discriminate between different materials in the object being scanned.

Figure 7:
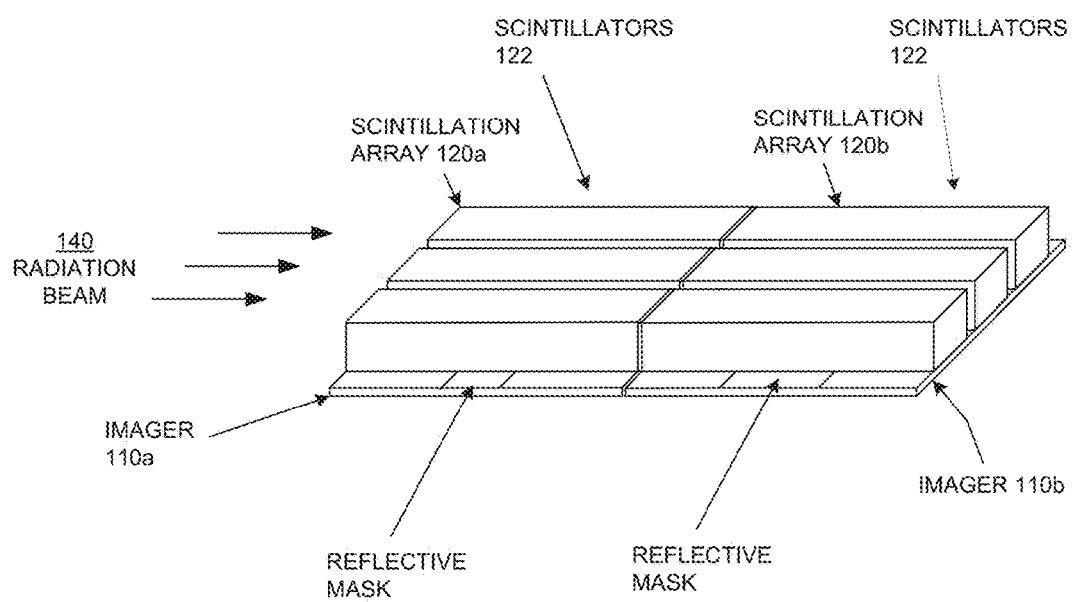
FIG. 7 shows a configuration of scintillator arrays and imagers in an embodiment according to the invention.

FIG. 7 shows a configuration of scintillator arrays and imagers in an embodiment according to the invention. In the example of FIG. 7, like the examples of FIGS. 4 and 6, the scintillators 122 in the scintillation array 120a are side-coupled to the imager 110a along their lengths. In the FIG. 7 embodiment, a second scintillation array 120b is located downstream of the scintillation array 120a. The scintillators 122 in the scintillation array 120b are side-coupled to a second imager 110b along their lengths. In an embodiment, the imagers 110a and 110b include reflective masks as described above; in another embodiment, one or more of the imagers do not include reflective masks. Attenuating material (e.g., lead or tungsten) can be placed in the beam path (e.g., after each scintillation array) to provide additional attenuation. While two scintillation arrays (two sets of scintillators) and two imagers are shown and described, the invention is not so limited.

Similar to what was just described above, an advantage of the FIG. 7 configuration is that it is possible to measure the energy spectrum of the radiation beam 140. In essence, there are multiple points (e.g., the different imagers) for collecting light photons. A higher-energy beam, for example, will generate more light photons at the furthest collection point (e.g., the imager 110b) than a lower-energy beam. By evaluating the number of counts associated with each of the imagers 110a, 110b, etc., the energy distribution of the radiation beam 140 can be estimated. This in turn makes it possible to discriminate between different materials in the object being scanned.

Figure 8:
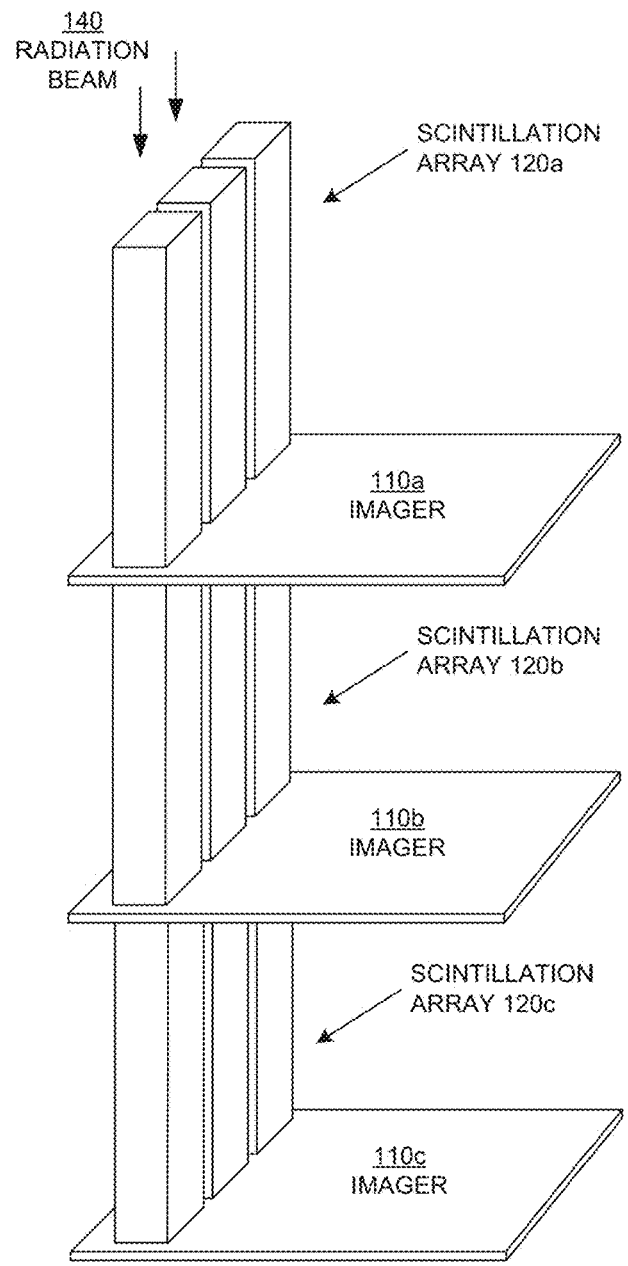
FIG. 8 shows a configuration of scintillator arrays and imagers in an embodiment according to the invention.

FIG. 8 shows a configuration of scintillator arrays and imagers in an embodiment according to the invention. As described above in conjunction with FIG. 2, the scintillators 122 in the scintillation array 120 can be coupled to the imager 110 such that their longitudinal axes 310 are perpendicular to the planar surface of the imager. In FIG. 8, multiple scintillation arrays 120 (120a, 120b, and 120c) and multiple imagers 110 (110a, 110b, and 110c) are stacked as shown. In the FIG. 8 embodiment, the scintillation arrays 120a, 120b, and 120c and imagers 110a, 110b, and 110c are arranged in an alternating fashion. That is, for example, a scintillation array is disposed between two imagers, and an imager is disposed between two scintillation arrays. Attenuating material (e.g., lead or tungsten) can be placed in the beam path (e.g., after each imager) to provide additional attenuation. While three layers of scintillation arrays and imagers are shown and described, the invention is not so limited.

Similar to what was just described above, an advantage of the FIG. 8 configuration is that it is possible to measure the energy spectrum of the radiation beam 140. In essence, there are multiple points (the different imagers) for collecting light photons. A higher-energy beam, for example, will generate more light photons at the furthest collection point (e.g., the imager 110c) than a lower-energy beam. By evaluating the number of counts associated with each of the imagers 110a, 110b, 110c, etc., the energy distribution of the radiation beam 140 can be estimated. This in turn makes it possible to discriminate between different materials in the object being scanned.

Figure 9B:
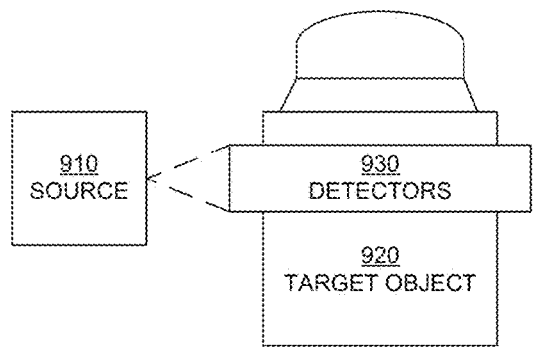

FIG. 9A illustrates the use of the system 100 for scanning an object 920, such as a cargo container or a truck trailer, in an embodiment according to the invention. A radiation source 910 (e.g., a linear particle accelerator) generates a fan-shaped radiation beam 940 (e.g., an x-ray beam) to and through the target object 920. A number of detectors 930, each exemplified by the system 100, are distributed in a plane that intersects the target object 920 as shown in the top-down view of FIG. 9B. The detectors 930 can be oriented at different angles (e.g., relative to horizontal) so that their front faces (the first surfaces 315 of FIG. 3) are facing the source 910. X-rays not absorbed by the object (e.g., the radiation beam 140 of FIG. 1A) strike the detectors 930. In this manner, large areas can be quickly scanned. Applications include line scanning for cargo and industrial imaging and fan beam CT (computed tomography) for industrial inspection.

To scan the entire target object 920, the object can move through the plane of detectors 930 while the detectors remain stationary, and/or the detectors can move (in unison) while the object remains stationary. In any case, with the scintillators 122 arranged side-by-side in the scintillation array 120 as described above (see FIGS. 1A and 2), known time-delay integration (TDI) techniques can be used to preserve image quality while quickly acquiring image data when the object 920 and the detectors 930 are moving relative to one another. For example, the relative speed between the object 920 and the detectors 930 can be established such that rays from the source 910 to the detectors shift an integer number of scintillators between each frame for TDI.

Figure 10:
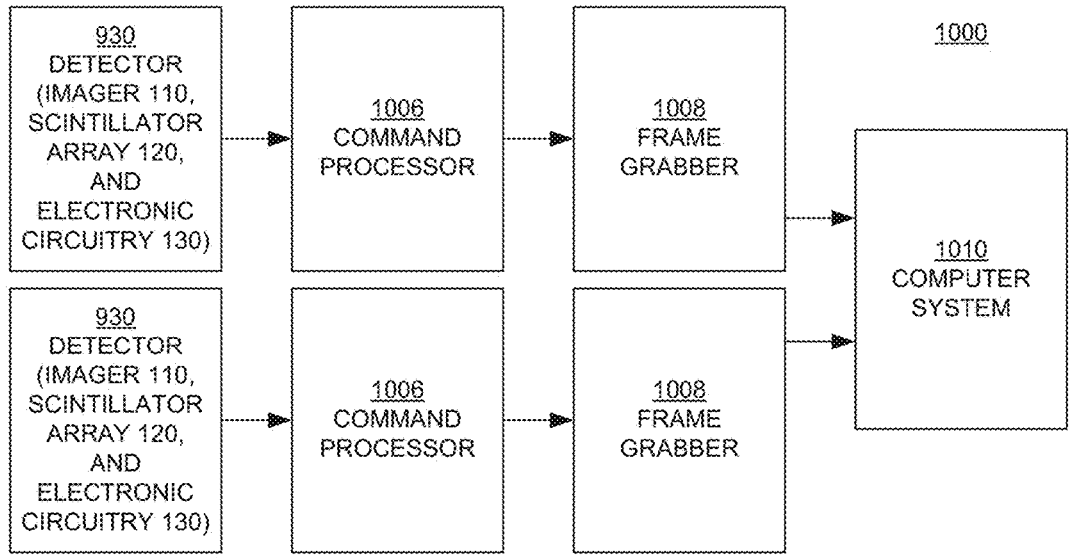
FIG. 10 is a block diagram showing elements of a radiation detection and scanning system according to an embodiment of the invention.

FIG. 10 is a block diagram showing elements of a radiation detection and scanning system 1000 according to an embodiment of the invention. In this embodiment, each of the detectors 930 (e.g., each exemplified by the system 100, including an imager 110, a scintillation array 120, and electronic circuitry 130) is coupled to a respective command processor 1006. The command processors 1006 are coupled to a frame grabber 1008, which may be coupled to a computer system 1010. Accordingly, signals generated by the detectors 930 can be accumulated frame-by-frame and then analyzed to produce a high quality image of an object being scanned.

The readouts and data from each of the detectors 930 can be synchronized and processed so that, in a sense, the multiple smaller detectors function as a single larger detector.

The computer system 1010 is capable of implementing embodiments according to the present invention. The computer system 1010 broadly includes any single or multi-processor computing device or system capable of executing computer-readable instructions. In its most basic configuration, the computer system 1010 may include at least one processing circuit and at least one storage medium. The processor generally represents any type or form of processing unit or circuit capable of processing data or interpreting and executing instructions. In an embodiment, the processor receives instructions from a software application or module. The storage medium generally represents any type or form of volatile or non-volatile storage device or medium capable of storing data and/or other computer-readable instructions.

The computer system 1010 may also include one or more components or elements in addition to the processor and storage medium. For example, the computer system 1010 may include an input/output (I/O) device such as a keyboard and mouse and a communication interface, each of which may be interconnected via a communication infrastructure (e.g., a bus). The computer system 810 may also include a display device.

The communication interface may be any type or form of communication device or adapter capable of facilitating communication between the computer system 1010 and one or more other devices. The communication interface can include, for example, a receiver and a transmitter that can be used to receive and transmit information (wired or wirelessly).

Figure 11:
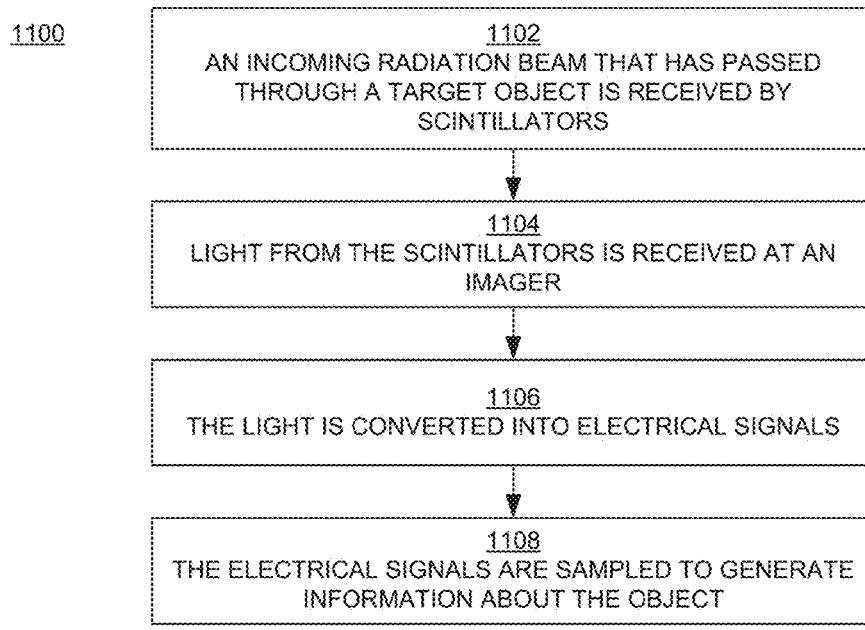
FIG. 11 is a flowchart of a method of using a radiation detector to scan an object according to an embodiment of the invention.

FIG. 11 is a flowchart 1100 of a method of using a radiation detector (e.g., the system 100 of FIG. 1A) to scan an object according to an embodiment of the invention. Although specific steps are disclosed in the flowchart 1100, such steps are only examples. That is, the present invention is well-suited to performing various other steps or variations of the steps recited in the flowchart 1100. In an embodiment, the method of the flowchart 1100 is performed by, for example, the system 1000 of FIG. 10.

In block 1102, an incoming radiation beam that has passed through the object is received by scintillators in the system 100 of FIG. 1A. As described herein, the scintillators are longer than they are wide, and are coupled to the imager of the system 100 with their respective longitudinal axes parallel to each other. In an embodiment, the scintillators are side-coupled to the imager such that the longitudinal axes are parallel to the planar surface. In another embodiment, the scintillators are coupled to the imager such that the longitudinal axes are perpendicular to the planar surface.

In block 1104, light from the scintillators is received at the imager.

In block 1106, the light is converted into electrical signals.

In block 1108, the electrical signals are sampled to generate information about the object. In an embodiment, only the signals from less than all of the rows of pixels in the imager are sampled per sample interval (e.g., in zoom mode).

In addition to the advantages already presented herein, embodiments according to the invention can be used with existing flat panel technology and can take advantage of recent and ongoing developments that improve the image quality and fidelity of flat panel imagers. For example, the invention can leverage existing components of a production product such as its glass and processing electronics.

Embodiments according to the invention also provide competitive advantages such as but not limited to use of dynamic gain for flat panel imagers, lag correction, scatter correction, beam hardening correction, and compatibility with software that is used to produce high-quality two-dimensional images and three-dimensional reconstructions.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system operable for detecting radiation, the system comprising:
   an imager comprising a first planar array of pixels; and
   a plurality of scintillators;
      wherein each scintillator has a length, height and a width;
      wherein each scintillator has a first end opposite from a second end on a longitudinal axis of the scintillator and that are separated by a distance that is the length of the scintillator;
      wherein the length of each scintillator is greater than its respective width such that each scintillator is a rectangular cuboid;
      wherein each scintillator has a first surface at its first end that is transverse to its respective longitudinal axis and that is configured to receive an incoming radiation beam;
      wherein the scintillators are coupled to the imager such that the respective longitudinal axes of the scintillators are parallel to each other;
      wherein an incoming radiation beam, that enters the scintillators through their respective first surfaces is converted by the scintillators into light that is received by respective subsets of the first planar array of pixels;
      wherein the imager generates signals in response to the light that is received by the subsets of the first planar array of pixels; and
      wherein the system is configured such that only a subset of the signals is sampled per sample interval and the subset of the signals corresponds to less than all of the pixels that receive the light.

2. The system of claim 1, wherein the scintillators are coupled to the imager such that the longitudinal axes are parallel to the first planar array of pixels.

3. The system of claim 2,
   wherein the imager further comprises a second planar array of pixels separated from the first planar array by light-reflective material,
   wherein the scintillators traverse the first planar array, the light-reflective material, and the second planar array, and
   wherein light generated in the scintillators downstream of the first planar array is reflected by the light-reflective material to the second planar array.

4. The system of claim 1, wherein the scintillators are coupled to the imager such that the longitudinal axes are perpendicular to the first planar array of pixels.

5. The system of claim 1, wherein each scintillator comprises light-reflective material on each of its respective surfaces except on its first surface and except on a second surface facing the imager.

6. The system of claim 1, wherein each scintillators comprises light-reflective material on its respective surfaces except on its first surface and except on at least a portion of a second surface facing the imager.

7. The system of claim 1, wherein the length of each scintillator is at least two times greater than its respective width.

8. A system for scanning an object, the system comprising:
   a plurality of detectors, each of the detectors operable for receiving a radiation beam that is generated by a source and that travels a path that passes through the object, wherein each of the detectors comprises:
      an imager comprising rows and columns of pixels arrayed on a planar surface;
      a plurality of scintillators coupled to the imager;
         wherein each scintillator has a length, height and a width;
         wherein each scintillator has a first end opposite from a second end on a longitudinal axis of the scintillator and that are separated by a distance that is the length of the scintillator;
         wherein the length of each scintillator is greater than its respective width such that each scintillator is a rectangular cuboid;
         wherein each scintillator has a first surface at its first end that is transverse to its respective longitudinal axis and that is configured to receive an incoming radiation beam;
         wherein the scintillators are coupled to the imager with their respective longitudinal axes parallel to each other and parallel to the path of the radiation beam;
         wherein the radiation beam enters the scintillators through their respective first surfaces and is converted by the scintillators into light that is received by respective subsets of the first planar array of pixels at the imager; and
         wherein the pixels that receive the light generate signals in response thereto; and
   circuitry coupled to the imager that converts the signals generated by the pixels into electrical signals;
   wherein the system is configured such that only a subset of the signals is sampled per sample interval and the subset of signals corresponds to less than all of the pixels that receive the light.

9. The system of claim 8, wherein the scintillators are coupled to the imager such that the longitudinal axes are parallel to the planar surface.

10. The system of claim 9,
    wherein the rows and columns of pixels comprise a first array of rows and columns of the pixels and a second array of rows and columns of the pixels,
    wherein the second array is separated from the first array by light-reflective material,
    wherein the scintillators traverse the first array, the light-reflective material, and the second array, and
    wherein light generated in the scintillators downstream of the first array is reflected by the light-reflective material to the second array.

11. The system of claim 8, wherein the scintillators are coupled to the imager such that the longitudinal axes are perpendicular to the planar surface.

12. The apparatus of claim 8, wherein each scintillator comprises light-reflective material on each of its respective surfaces except on its first surface and except on its second surface facing the imager.

13. The system of claim 8, wherein each scintillator comprises light-reflective material on each of its respective surfaces except on its first surface and except on at least a portion of a second surface of the scintillator facing the imager.

14. The system of claim 8, wherein the system is configured such that the subset of the signals includes only the signals from less than all of the rows of pixels.

15. A method for scanning an object, the method comprising:
receiving, at a plurality of scintillators, an incoming radiation beam that has passed through the object;
wherein each scintillator has a first end opposite from a second end on a longitudinal axis of the scintillator and that are separated by a distance that is the length of the scintillator;
wherein each scintillator has a length, height and a width;
wherein the length of each scintillator is greater than its respective width such that each scintillator is a rectangular cuboid;
wherein each scintillator has a first surface at its first end that is transverse to its respective longitudinal axis and that is configured to receive an incoming radiation beam;
wherein the plurality of scintillators are coupled to an imager with their respective longitudinal axes parallel to each other;
wherein the incoming radiation beam enters the scintillators through their respective first surfaces;
wherein the imager comprises pixels; and
wherein the radiation beam is converted by the scintillators into light;
receiving the light from the scintillators at subsets of the pixels at the imager; and
converting the light into electrical signals; and
sampling, per sample interval, only a subset of the electrical signals, which corresponds to less than all of the pixels that receive the light, to generate information about the object.

16. The method of claim 15, wherein the imager comprises rows and columns of pixels arrayed on a planar surface, wherein the scintillators are coupled to the imager such that the longitudinal axes are parallel to the planar surface.

17. The method of 16,
wherein the rows and columns of pixels comprise a first array of rows and columns of the pixels and a second array of rows and columns of the pixels,
wherein the second array is separated from the first array by light-reflective material,
wherein the scintillators traverse the first array, the light-reflective material, and the second array, and
wherein light generated in the scintillators downstream of the first array is reflected by the light-reflective material to the second array.

18. The method of claim 16, wherein only the scintillators are coupled to the imager such that the longitudinal axes are perpendicular to the planar surface.

19. The method of claim 16, wherein only the signals from less than all of the rows of pixels are sampled per sample interval.

20. The method of claim 15, wherein the scintillators comprise light-reflective material that causes the light generated by the scintillators to reflect within the scintillators.

* * * * *